(12) United States Patent
King et al.

(10) Patent No.: US 7,770,981 B2
(45) Date of Patent: Aug. 10, 2010

(54) DUMP BED CONNECTION APPARATUS AND VEHICLES INCLUDING SAME

(75) Inventors: Darin D. King, Raymond, OH (US); Scott T. Blanford, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 205 days.

(21) Appl. No.: 12/212,078

(22) Filed: Sep. 17, 2008

(65) Prior Publication Data

US 2010/0066152 A1    Mar. 18, 2010

(51) Int. Cl.
*B61D 9/00*    (2006.01)

(52) U.S. Cl. .................. 298/17.7; 298/17.5; 298/17.6; 298/22 F

(58) Field of Classification Search ....... 298/17.5–17.8, 298/22 F, 9, 12, 13, 18
See application file for complete search history.

(56) References Cited

U.S. PATENT DOCUMENTS

| | | | | |
|---|---|---|---|---|
| 1,071,265 A | | 8/1913 | Schlatter | |
| 1,534,439 A | * | 4/1925 | Burkhardt et al. | ......... 298/22 R |
| 1,595,981 A | * | 8/1926 | Ballert | ...... 298/17.7 |
| 1,617,628 A | * | 2/1927 | Gage | ............ 213/12 |
| 1,638,009 A | * | 8/1927 | Cambessedes | ...... 298/17.7 |
| 1,831,489 A | * | 11/1931 | Flowers | ...... 298/17.7 |
| 1,965,476 A | * | 7/1934 | Smith | ............ 298/38 |
| 2,023,700 A | * | 12/1935 | Rodler | ...... 298/17.6 |
| 2,029,995 A | * | 2/1936 | Flowers | ...... 298/17.7 |
| 2,032,840 A | * | 3/1936 | Flowers | ...... 298/17.7 |
| 2,047,051 A | * | 7/1936 | Armington et al. | ........ 298/17.7 |
| 2,971,787 A | * | 2/1961 | Lincoln | ...... 403/39 |
| 3,326,605 A | * | 6/1967 | Steingas et al. | ........... 298/17.7 |
| 3,730,591 A | * | 5/1973 | Griffis | ...... 298/17.6 |
| 4,429,888 A | | 2/1984 | Wu | |
| 4,995,773 A | | 2/1991 | Lamoureux et al. | |
| 5,267,780 A | | 12/1993 | Friesen et al. | |
| 5,360,259 A | | 11/1994 | Lemberger | |
| 6,238,166 B1 | | 5/2001 | Collier | |
| 6,557,882 B2 | | 5/2003 | Harrington | |
| 6,672,821 B1 | | 1/2004 | McClam, Jr. | |
| 6,749,267 B1 | | 6/2004 | Brooks et al. | |

\* cited by examiner

*Primary Examiner*—Patricia L Engle
(74) *Attorney, Agent, or Firm*—Ulmer & Berne LLP

(57) ABSTRACT

An apparatus connects a dump bed to a frame structure of a vehicle and facilitates tipping of the dump bed in a selected one of a plurality of directions from a load carrying position. The apparatus includes a ball joint assembly. The ball joint assembly is configured to selectively facilitate tipping of the dump bed as directed by an actuator. Vehicles including a ball joint assembly are also provided.

19 Claims, 13 Drawing Sheets

US 7,770,981 B2

DUMP BED CONNECTION APPARATUS AND VEHICLES INCLUDING SAME

TECHNICAL FIELD

The present invention relates to utility vehicles which have a dump-type cargo bed.

BACKGROUND

Many conventional utility vehicles include a dump-type cargo bed which is capable of being selectively titled from a load carrying position to a dumping position.

SUMMARY

In accordance with one embodiment, a vehicle comprises a frame structure, a dump bed, and a ball joint assembly coupling the dump bed to the frame structure. The ball joint assembly comprises a ball and a receiver. The ball defines first and second grooves and comprises an external surface. The receiver comprises an internal surface. A portion of the internal surface of the receiver engages a portion of the external surface of the ball. One of the ball and the receiver is attached to the frame structure, and the other of the ball and the receiver is attached to the dump bed. A first retaining element is moveably coupled with the receiver and is configured to selectively engage the first groove in the ball. A second retaining element is moveably coupled with the receiver and is configured to selectively engage the second groove in the ball. An actuator is coupled with each of the first and second retaining elements and is configured to facilitate selective engagement of the first groove by the first retaining element and the second groove by the second retaining element.

In accordance with another embodiment, a vehicle comprises a frame structure, a dump bed, and a ball joint assembly movably coupling the dump bed to the frame structure such that the dump bed is selectively tiltable to any of a left tilting position, a right tilting position, and a rear tilting position. The vehicle further comprises an actuator coupled with the ball joint assembly and movable among at least three positions respectively corresponding with the left tilting position, the right tilting position, and the rear tilting position. The ball joint assembly is configured to selectively facilitate tipping of the dump bed as directed by the actuator.

In accordance with yet another embodiment, an apparatus is provided for connecting a dump bed to a frame structure of a vehicle and facilitating tipping of the dump bed in a selected one of a plurality of directions from a load carrying position. The apparatus comprises a ball joint assembly, a first retaining element, a second retaining element, and an actuator. The ball joint assembly comprises a ball and a receiver. The ball defines first and second grooves and comprises an external surface. The receiver comprises an internal surface. A portion of the internal surface of the receiver engages a portion of the external surface of the ball. One of the ball and the receiver is adapted to attach to a frame structure of a vehicle. The other of the ball and the receiver is adapted to attach to a dump bed. The first retaining element is moveably coupled with the receiver and is configured to selectively engage the first groove in the ball. The second retaining element is moveably coupled with the receiver and is configured to selectively engage the second groove in the ball. An actuator is coupled with each of the first and second retaining elements and is configured to facilitate selective engagement of the first groove by the first retaining element and the second groove by the second retaining element.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
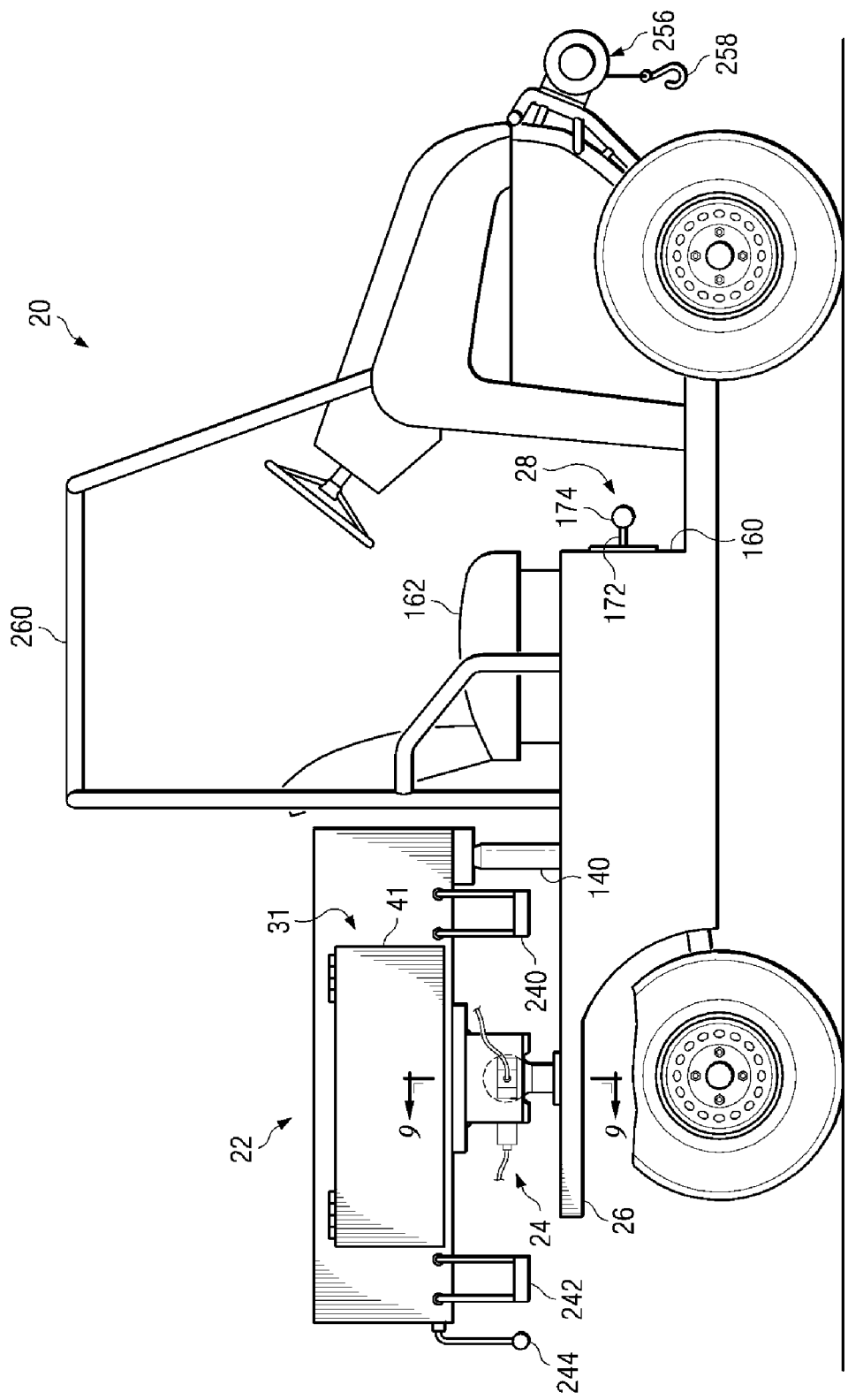
FIG. 1 is a side elevational view depicting a utility vehicle having a dump bed in accordance with one embodiment, wherein the dump bed is in a load carrying position, and wherein a portion of the right rear wheel is broken out for clarity of illustration.

Certain embodiments are hereinafter described in detail in connection with the views and examples of FIGS. 1-15. A dump-type vehicle includes a dump bed which can be used to facilitate carrying of cargo by the vehicle, and selective dumping of cargo from the dump bed of the vehicle. In one embodiment, a dump-type vehicle can comprise a light utility vehicle, such as the utility vehicle 20 shown in FIG. 1. In other embodiments, a dump-type vehicle can comprise any of a variety of other types of vehicles having a utility bed capable of dumping such as, for example, a pickup truck, a dump truck, an all terrain vehicle ("ATV"), and a golf cart.

The utility vehicle 20 includes a frame structure 26. The frame structure 26 can include any of a variety of structural and/or decorative rails, panels, and/or other components which are typically, although not necessarily, formed from metal (e.g., steel and/or aluminum). The utility vehicle 20 can also include a dump bed 22 which is moveably attached to the frame structure 26 by a ball joint assembly 24. In accordance with one embodiment, the ball joint assembly 24 movably couples the dump bed 22 to the frame structure 26 such that the dump bed 22 is selectively tiltable to any of a load carrying position (shown in FIG. 1), a left tilting position (shown in FIG. 4), a right tilting position (shown in FIG. 5), and a rear tilting position (shown in FIG. 6). The ball joint assembly 24 can be configured to selectively facilitate tipping of the dump bed as directed by an actuator 28 as described below.

Figure 3:
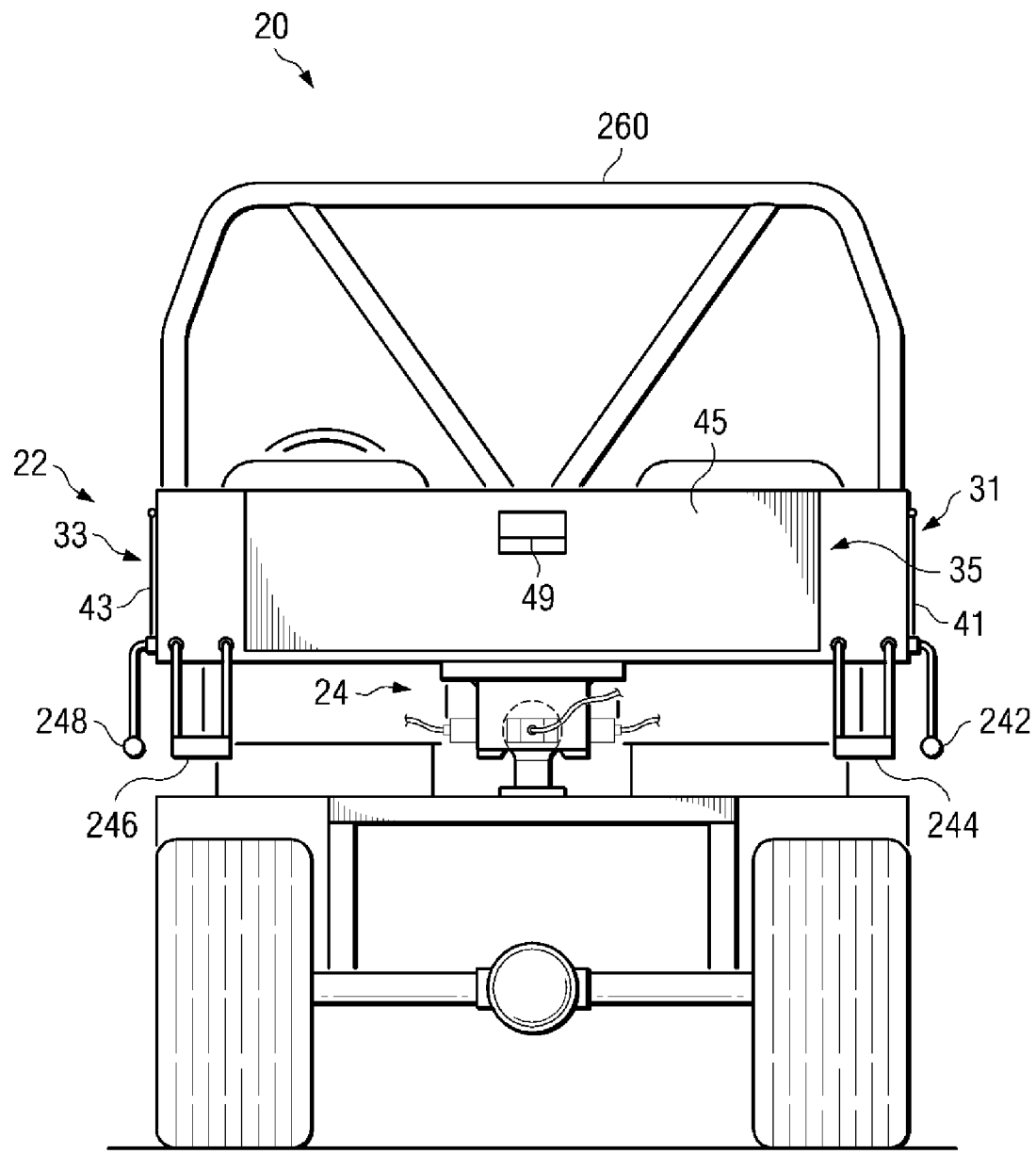
FIG. 3 is a rear elevational view depicting the utility vehicle of FIG. 1.
Figure 4:
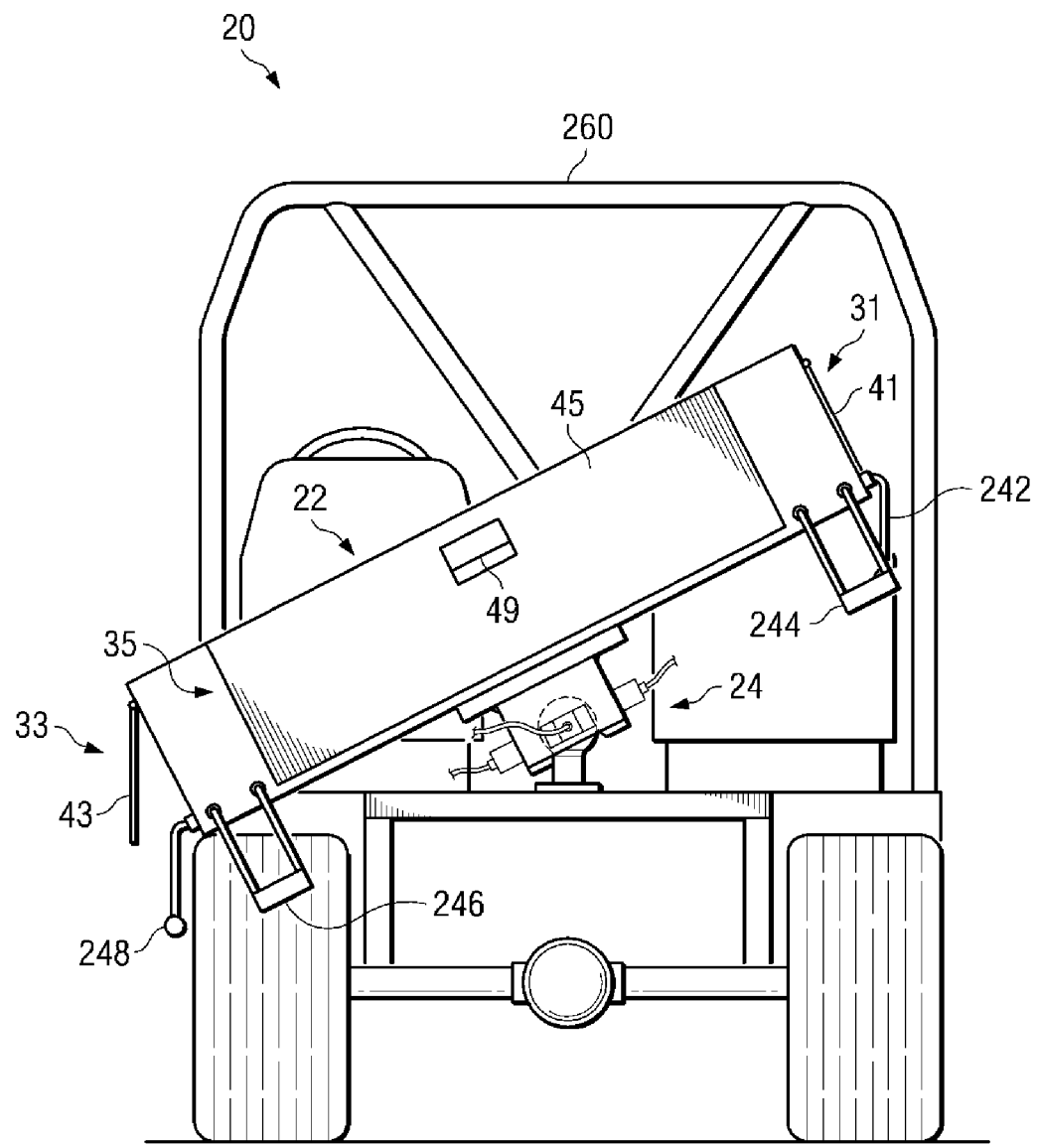
FIG. 4 is a rear elevational view depicting the utility vehicle of FIG. 1, wherein the dump bed is in a left tilting position.

The dump bed 22 is shown in FIGS. 1 and 3-6 to comprise sidewalls 31, 33, and 35 which include respective gates 41, 43 and 45 to facilitate pouring of cargo from the dump bed 22 when the dump bed 22 is tipped in a direction toward the respective one of the gates 41, 43 and 45. It will be appreciated that one or more of the gates 41, 43, and 45 might be configured to open (e.g., by hinged action) automatically upon tipping of the dump bed 22, though one or more of the gates might include a handle (e.g., 49 on gate 45 as shown in FIG. 3) or other mechanical interlock which requires specific action by an operator to effect opening of the gate. Though the dump bed 22 is shown to comprise the sidewalls 31, 33, and 35, it will be appreciated that a dump bed might not include any sidewalls and might, for example, comprise a flat-bed type configuration (e.g., commonly useful for carrying small vehicles). The utility vehicle 20 can be used in many applications where the ability to dump in multiple directions is useful, as geography or surrounding obstacles may make dumping in one direction (e.g., to the rear) awkward or impossible, though dumping in another direction (e.g., to a side) may prove more effective.

Figure 2:
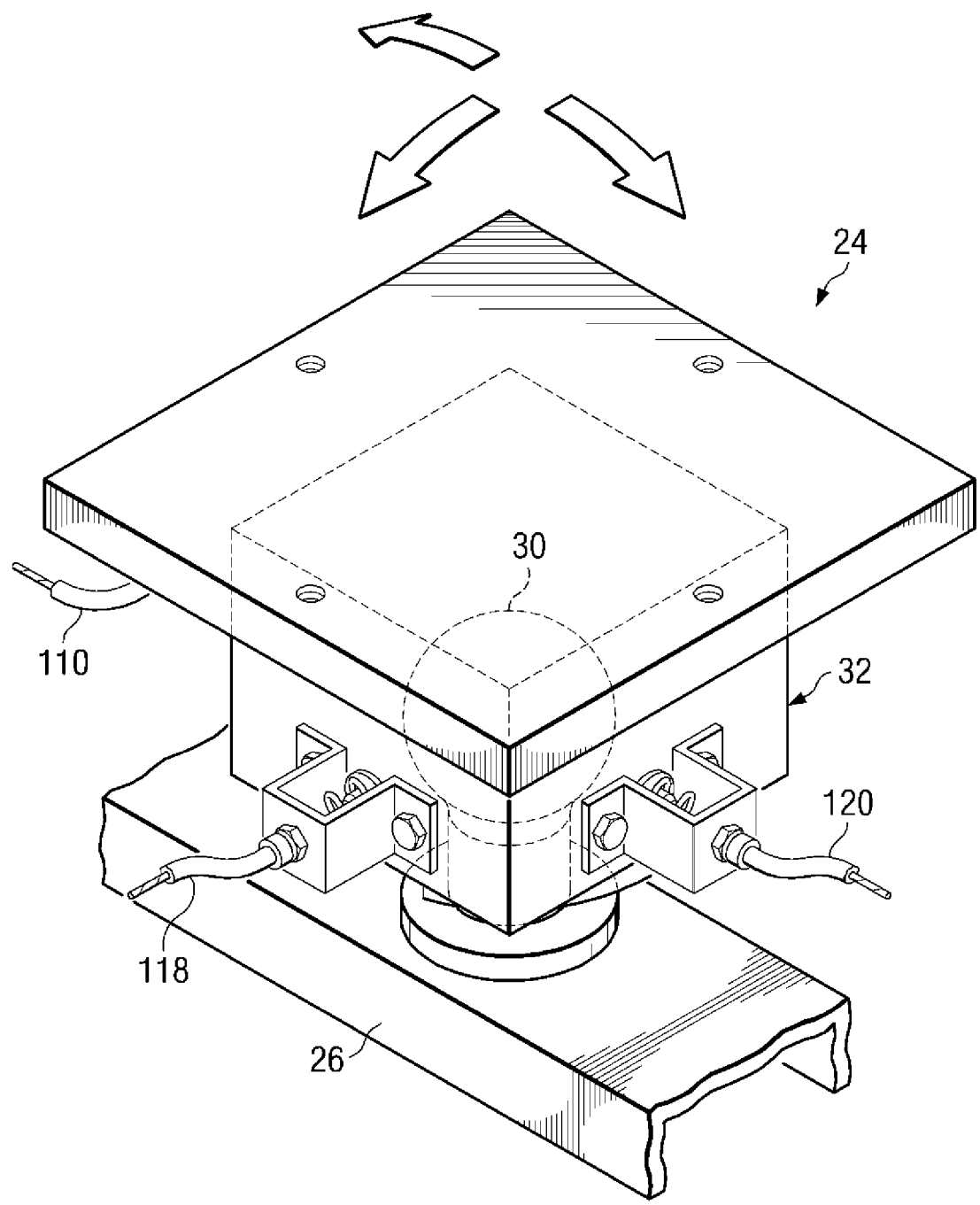
FIG. 2 is an enlarged perspective view depicting a portion of the utility vehicle of FIG. 1, wherein certain components have been removed for clarity of illustration, and wherein the portion includes, among other components, a ball and a receiver.
Figure 7:
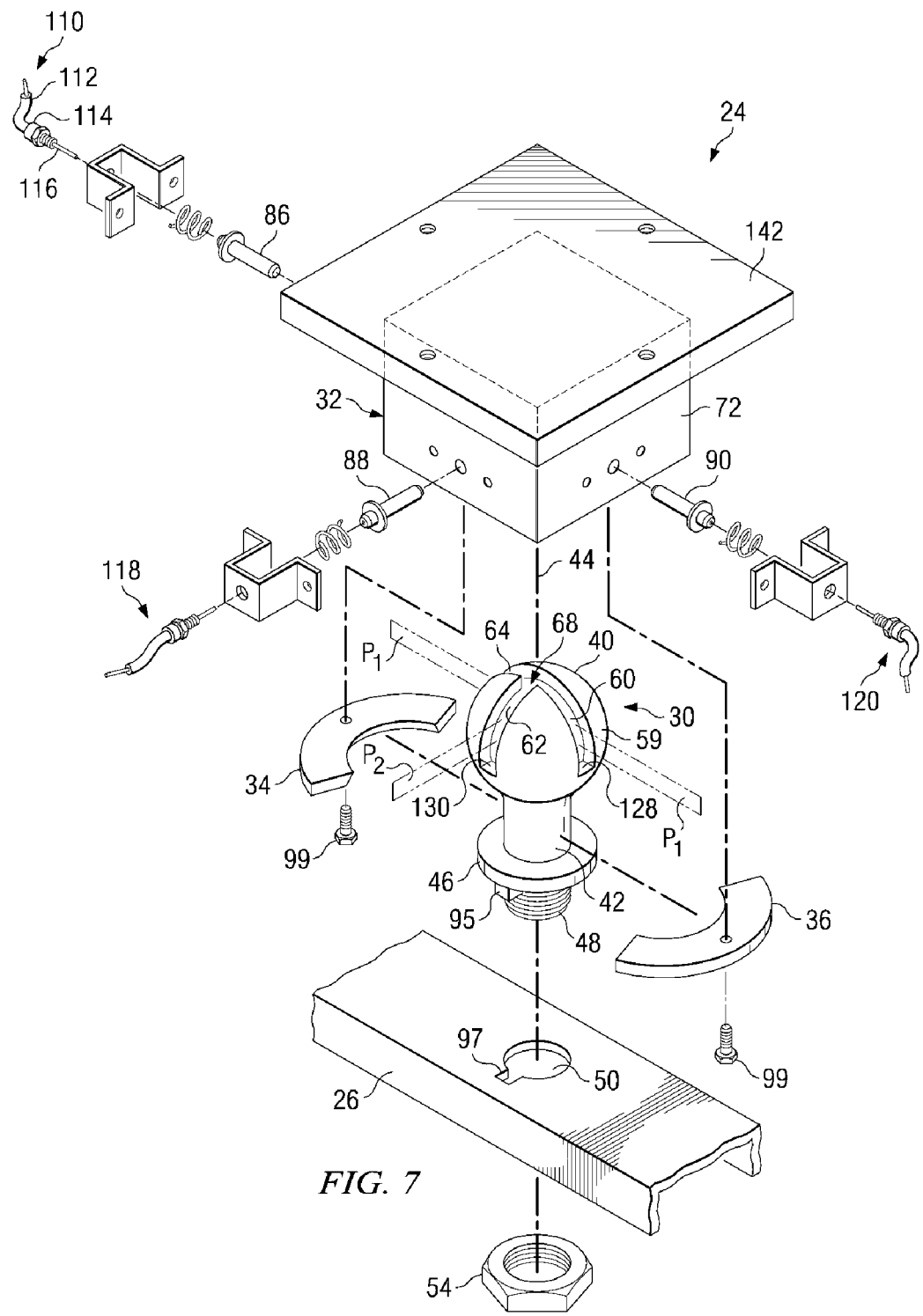
FIG. 7 is an exploded perspective view depicting the portion of the utility vehicle of FIG. 2.

With reference to FIGS. 2 and 7, the ball joint assembly 24 can include a ball 30, a receiver 32, and retaining rings 34 and 36. The ball 30 is shown to have a spherical head 40 and a mounting post 42. The mounting post 42 can be generally cylindrical and can define an axis 44 which extends down from the spherical head 40 through the center of the mounting post 42, as shown in FIG. 7. In that embodiment, the mounting post 42 can be provided with a flange 46 and a threaded end portion 48. To facilitate attachment of the ball joint assembly 24 to the frame structure 26, the threaded end portion 48 can pass through a suitable opening 50 in the frame structure 26. One or more keys (e.g., 95) extending outwardly from the threaded end portion 48 can engage one or more corresponding keyways (e.g., 97) in the frame structure 26 to inhibit rotation of the ball 30 with respect to the frame structure 26. A nut 54 can then be threaded onto the threaded end 48 to lock the ball 30 in place with respect to the frame structure 26. The flange 46 is shown as projecting outwardly from the mounting post 42, but it will be appreciated that a flange might alternatively be formed by manufacturing a threaded end of a ball to have a smaller diameter than the remainder of the mounting post of the ball. In an alternative embodiment, it will be appreciated that a ball might not include a threaded end and/or any other portion which extends through an aperture in a frame structure, but might rather include an enlarged flange which is suitable for contacting a frame structure for attachment thereto such as with fasteners (e.g., bolts) and/or welding.

Figure 8:
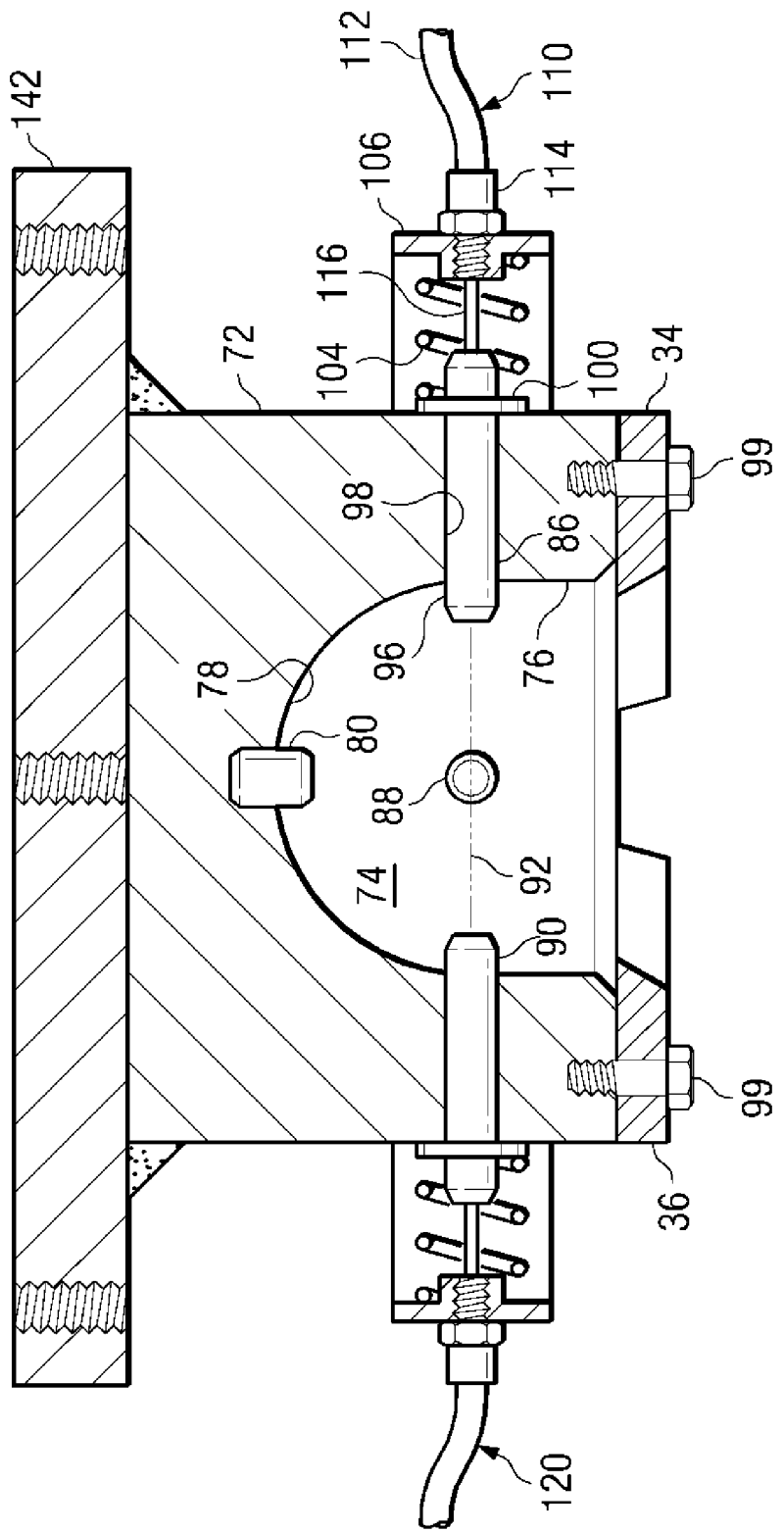
FIG. 8 is a cross-sectional view depicting the receiver of FIG. 2.
Figure 9:
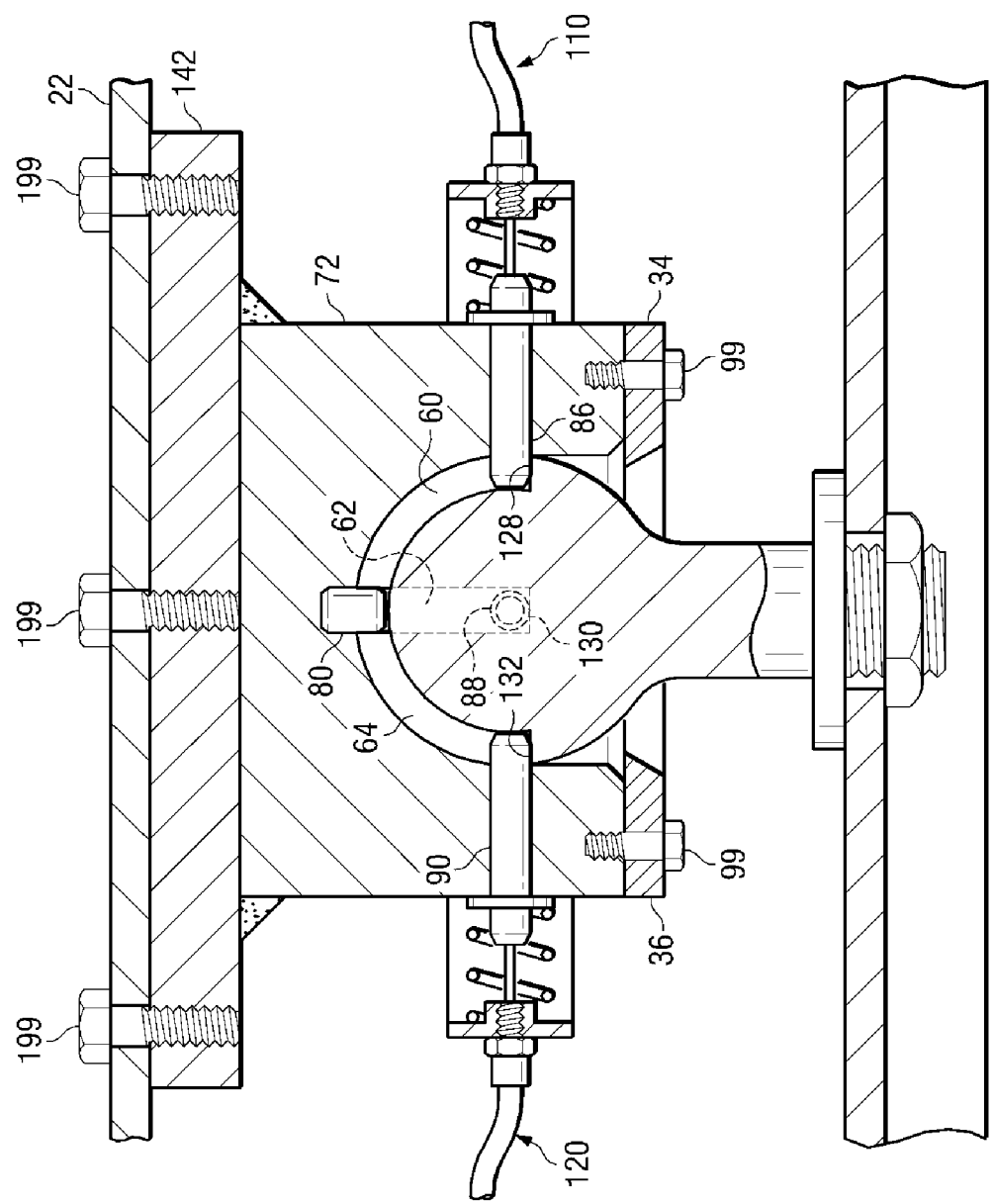
FIG. 9 is a cross-sectional view taken along section lines 9-9 in FIG. 1.

The spherical head 40 of the ball 30 is shown in FIG. 7 to comprise an external surface 59 and to define grooves 60, 62, and 64. In particular, the grooves 60, 62 and 64 are shown in FIG. 7 to comprise respective meridional slots which each approach and meet at an intersection 68 where the axis 44 intersects the top of the spherical head 40. Though the intersection 68 is shown to join the grooves 60, 62 and 64, it will be appreciated that an intersection of a ball might alternatively separate respective such grooves. The grooves 60, 62, and 64 each comprise a respective end wall 128, 130, and 132 opposite the intersection 68, as shown in FIGS. 7-9. The grooves 60 and 64 are aligned with one another, and the groove 62 extends perpendicularly with respect to the grooves 60, 64. In particular, when the ball 30 is attached to the frame structure 26, the ball 30 can be vertically bisected by first and second planes $P_1$ and $P_2$ (portions of which are shown in FIG. 7) which orthogonally intersect one another, such that the first plane $P_1$ (a vertical plane that extends from side to side of the utility vehicle 20) bisects the grooves 60 and 64, and the second plane $P_2$ (normal to the first plane $P_1$ and parallel with a longitudinally-extending front-to-back axis of the utility vehicle 20) bisects the groove 62. It will be appreciated that one or more of the grooves in a spherical head of a ball might not comprise meridional slots, and that a spherical head of a ball can be provided with any of a variety of other suitable quantities and arrangements of grooves.

The receiver 32 is shown in FIGS. 7-8 to comprise a body member 72 and a flange 142. The flange 142 can be configured for attachment to the dump bed 22 such as with fasteners (e.g., bolts 199 in FIG. 9). The body member 72 can define a cavity 74 which is configured to receive the spherical head 40 of the ball 30. In particular, the body member 72 includes an internal surface having a cylindrical portion 76 and a hemispherical inner end portion 78 which together cooperate to define the cavity 74. A portion of the internal surface (e.g., the hemispherical inner end portion 78) can be proportioned to contact a portion of the external surface 59 of the spherical head 40 and to turn smoothly on the spherical head 40. If desired, the portion of the receiver 32 which contacts the spherical head 40 can be lined in whole or in part with bronze or another suitable bearing material, and/or lubrication may be supplied as through a grease fitting (not shown) or the like. Once the spherical head 40 of the ball 30 is inserted into the cavity 74 of the receiver 32, the retaining rings 34 and 36 can be attached to the receiver 32 (e.g., with bolts 99 in FIGS. 7 and 9) to facilitate retention of the spherical head 40 within the receiver 32. It will be appreciated that, in an alternative embodiment, a utility vehicle can include a ball joint assembly having a receiver attached to a frame structure of the vehicle and a ball attached to a dump bed of the vehicle.

In one embodiment, the receiver 32 can include a fixed pin 80, as shown in FIGS. 8-9. The fixed pin 80 can be cylindrical and can project radially inwardly along the axial centerline of the cylindrical portion 76 and thus coaxially with the pole of the hemispherical inner end portion 78. The fixed pin 80 can be proportioned to be selectively received within the grooves 60, 62, and 64 when the ball 30 is engaged with the receiver 32. In one embodiment, the fixed pin 80 can be received in the intersection 68 when the receiver 32 is in a central position with respect to the ball 30 (as in FIG. 9). Though the fixed pin 80 is shown to be a solid member, it will be appreciated that a fixed pin can alternatively include a friction reducing device such as a ball bearing or bronze sleeve to enable it to slide easily in the grooves 60, 62, and 64. In another embodiment, it will be appreciated that a fixed pin might not have a cylindrical shape, but might rather have any of a variety of other suitable shapes. It will also be appreciated that a fixed pin might not be attached to a receiver, but might rather be attached to a ball and configured to engage grooves which can be provided in the receiver. In still another embodiment, a ball joint assembly might not include a fixed pin. It will be appreciated that the fixed pin 80 can work in conjunction with the retaining elements described below to selectively restrict movement of the receiver 32 with respect to the ball 30.

A ball joint assembly can also include one or more retaining elements which are moveable to selectively facilitate and inhibit movement of a receiver with respect to a ball. For example, the receiver 32 is shown in FIG. 8 to include three respective retaining elements in the form of retractable pins 86, 88, and 90. The retractable pins 86 and 90 are shown to be selectively axially movable along a common axis which diametrically bisects a circle 92 defined where the hemispherical inner end portion 78 meets the cylindrical portion 76 in the receiver 32. The retractable pin 88 can also move axially, but along an axis which diametrically bisects the circle 92 orthogonally to the common axis. With the retractable pins 86, 88, and 90 so arranged, when the spherical head 40 of the ball 30 is inserted into the receiver 32 and is within a central position (shown in FIG. 9), the retractable pins 86, 88, and 90, when each engaged with the respective grooves 60, 62, and 64, can be adjacent to the respective end walls 128, 130, 132 of the respective grooves 60, 62, and 64.

Each of the retractable pins 86, 88, and 90 can be biased by a respective spring (e.g., 104 for retractable pin 86) to an extended position in which it projects radially inwardly into the cavity 74 by an amount approximately equal to, or less than, the depth of the respective corresponding groove 60, 62, and 64 in the ball 30. For example, the retractable pin 86 includes a shaft 96 which extends through a suitable bore 98 in the body member 72 of the receiver 32. The fit between the shaft 96 and the bore 98 can be such that the retractable pin 86 can slide freely axially with respect to the bore 98. The retractable pin 86 can also include a collar 100 which extends radially outwardly from the shaft 96. The collar 100 can serve as an abutment for the spring 104 and can additionally serve to limit axial movement of the retractable pin 86 into the cavity 74. The outer end of the spring 104 can abut against a bracket 106 which is rigidly attached to the body member 72 such that the spring 104 biases the retractable pin 86 radially inwardly. It will be appreciated that the retractable pins 88 and 90 can each be associated with the body member 72 and ball 30 in a manner similar to that described above with respect to the retractable pin 86.

Referring to FIGS. 8-9, the retractable pin 86 can be moved radially outwardly against the bias of the spring 104 by a flexible cable such as a Bowden-type cable 110. The Bowden-type cable 110 can include an outer sheath 112, which surrounds and protects an inner cable 116 which is moveable relative to the outer sheath 112. An end of the outer sheath 112 can be received in an adjuster nut 114 which in turn is received within a suitable threaded aperture in the bracket 106. The inner cable 116 can be connected to the first retractable pin 86 such that movement of the inner cable 116 relative to the outer sheath 112 results in corresponding movement of the retractable pin 86 relative to the body member 72. Other respective Bowden-type cables 118 and 120 can be connected to facilitate movement of the respective retractable pins 88 and 90 in a similar manner as described above with respect to the retractable pin 86. In lieu of Bowden-type cables, it will be appreciated that any of a variety of other mechanical linkages and/or electromechanical actuators can be provided to facilitate movement of retractable pins or other retaining elements of a ball joint assembly.

With each of the retractable pins 86, 88, and 90 being spring-biased into extended positions (as shown with respect to at least the retractable pins 86 and 90 in FIG. 9), movement of the receiver 32 with respect to the ball 30 can be prohibited. In particular, in this position, the retractable pins 86, 88, and 90 can prevent rearward, left, and right tilting movement of the receiver 32 with respect to the ball 30, particularly through contact of the retractable pins 86, 88, and 90 with the respective end surfaces 128, 130, and 132 of the grooves 60, 62, and 64. In the embodiment of FIG. 7, as no groove extends from the intersection 68 in a direction opposite the groove 62, the fixed pin 80 can prevent forward tilting movement of the receiver 32 with respect to the ball 30, particularly through contact of the fixed pin 80 with an end surface of the groove 62 opposite the end surface 130. A bumper member 140 (FIG. 1) can additionally or alternatively be provided to prevent the dump bed 22 from ever tipping forward, and thus to prevent the receiver member 32 from ever tiling forward with respect to the ball 30. If so provided, the fixed stop 140 can be attached to the frame structure 26 to selectively engage a forward end region of the dump bed 22, as shown in FIG. 1. The fixed stop 140 can be positioned along an axial centerline of the utility vehicle 20 so as not to interfere with tipping of the dump bed 22 to the left or right sides of the utility vehicle 20. It will be appreciated that one or more fixed stops can be provided in any of a variety of other suitable locations for preventing tipping of a dump bed in one or more directions (e.g., forward).

Figure 5:
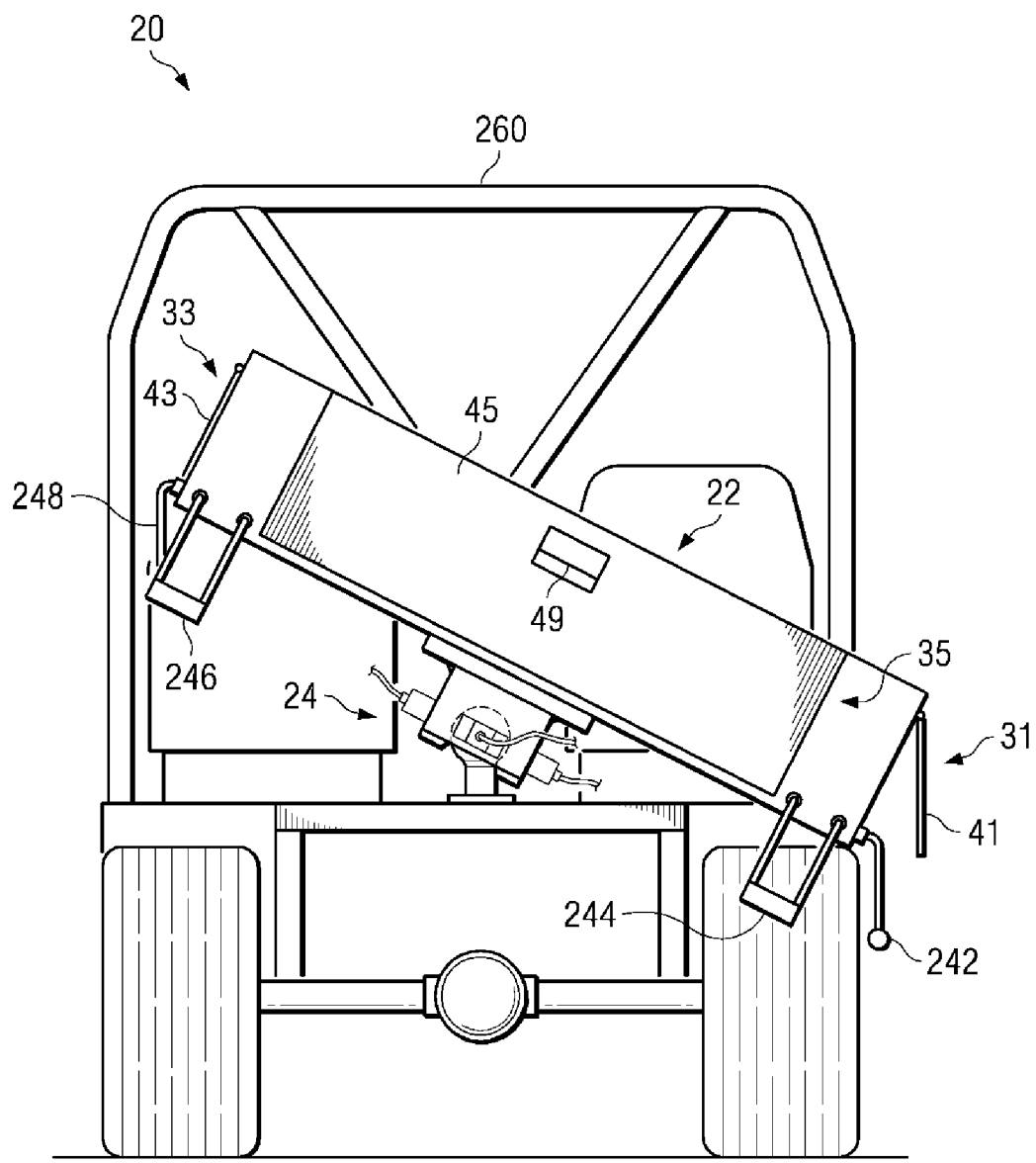
FIG. 5 is a rear elevational view depicting the utility vehicle of FIG. 1, wherein the dump bed is in a right tilting position.
Figure 6:
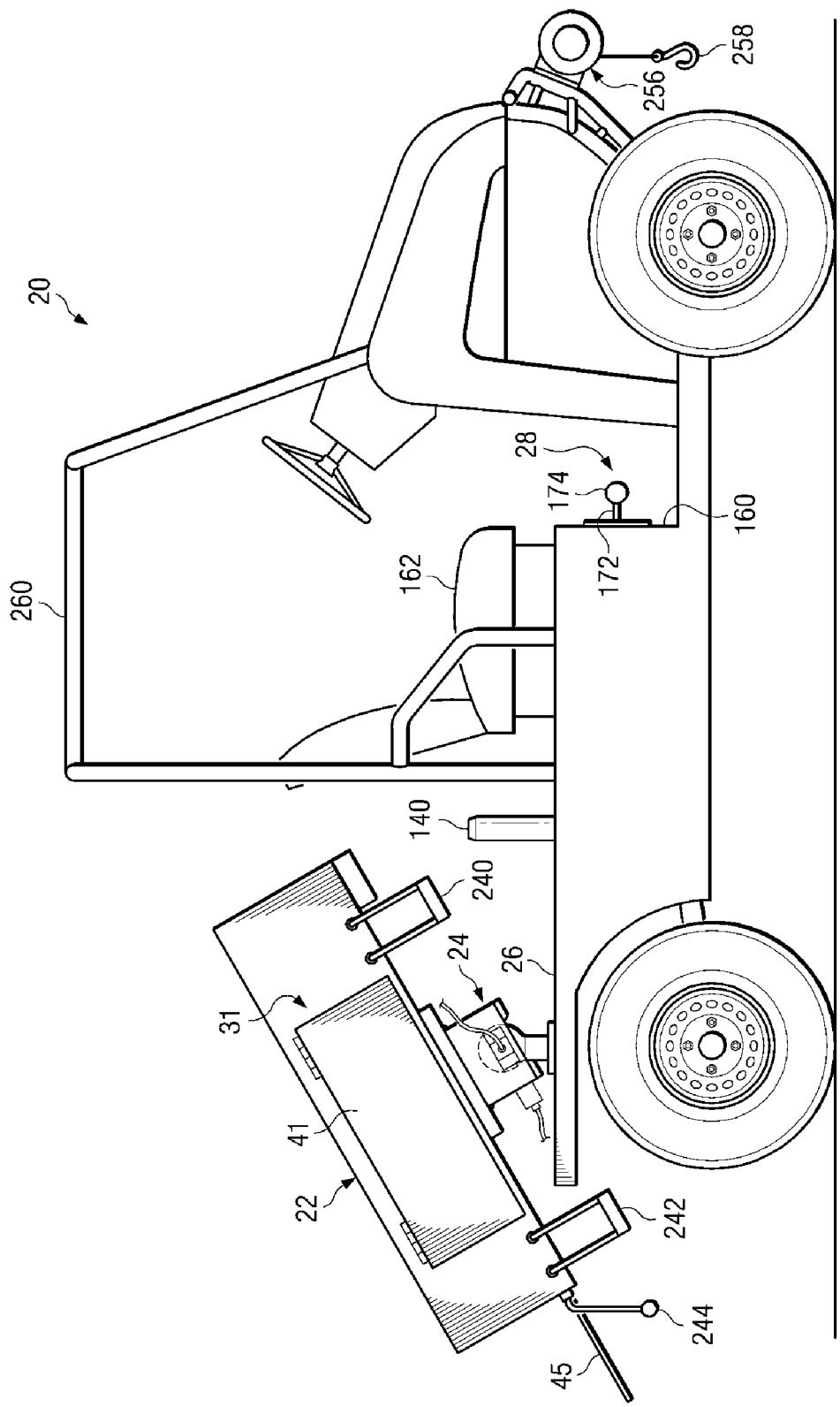
FIG. 6 is a rear elevational view depicting the utility vehicle of FIG. 1, wherein the dump bed is in a rear tilting position.
Figure 10:
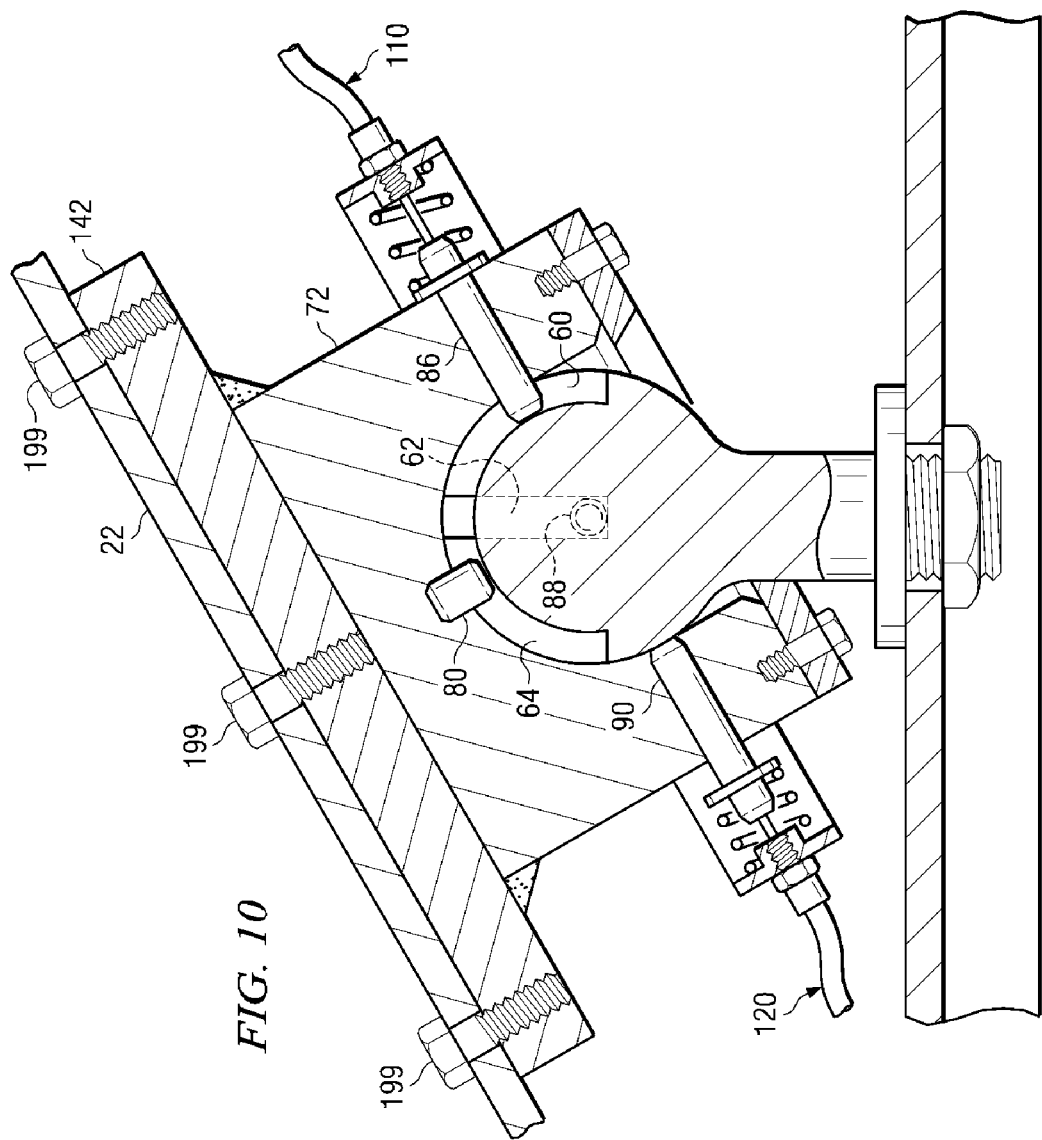
FIG. 10 is a cross-sectional view similar to FIG. 9, but with the dump bed in the right tilting position as opposed to the load carrying position.

The dump bed 22 can be permitted to tip either to the left (FIG. 4), the right (FIG. 5), or to the rear (FIG. 6), depending upon which one of the retractable pins 86, 88, and 90 is in a retracted position. For example, FIG. 10 depicts the retractable pin 90 in a retracted position. When the retractable pin 90 is retracted from the groove 64, the retractable pin 86 travels freely in the groove 60, the fixed pin 80 travels freely in the groove 64, and the receiver 32 pivots about an axis defined by the retractable pin 88 so that the dump bed 22 can tip to the right (as in FIG. 5). During this movement, the retractable pin 88 can remain engaged with the groove 62 because it is coaxial with the axis of rotation of the receiver 32. The engagement of the fixed pin 80 and the retractable pins 86 and 88 with the respective grooves 64, 60, and 62 controls, the tilting movement of the receiver 32 and so of the dump bed 22 to ensure that the dump bed 22 tips only in a desired direction, for example, to the right as shown in FIGS. 5 and 10. Disengaging the retractable pin 86 from the groove 60 (but with the retractable pins 88 and 90 engaged with the respective grooves 62 and 64) allows the receiver 32 to pivot about an axis defined by the retractable pin 88, the fixed pin 80 to travel in the groove 60, and the dump bed 22 to tilt in a left direction (shown in FIG. 4). Disengaging the retractable pin 88 from the groove 62 (but with the retractable pins 86 and 90 engaged with the respective grooves 60 and 64) allows the receiver 32 to tilt about an axis defined by the retractable pins 86 and 90, the fixed pin 80 to travel in the groove 62, and the dump bed 22 to tip in a rearward direction (shown in FIG. 6).

Figure 11:
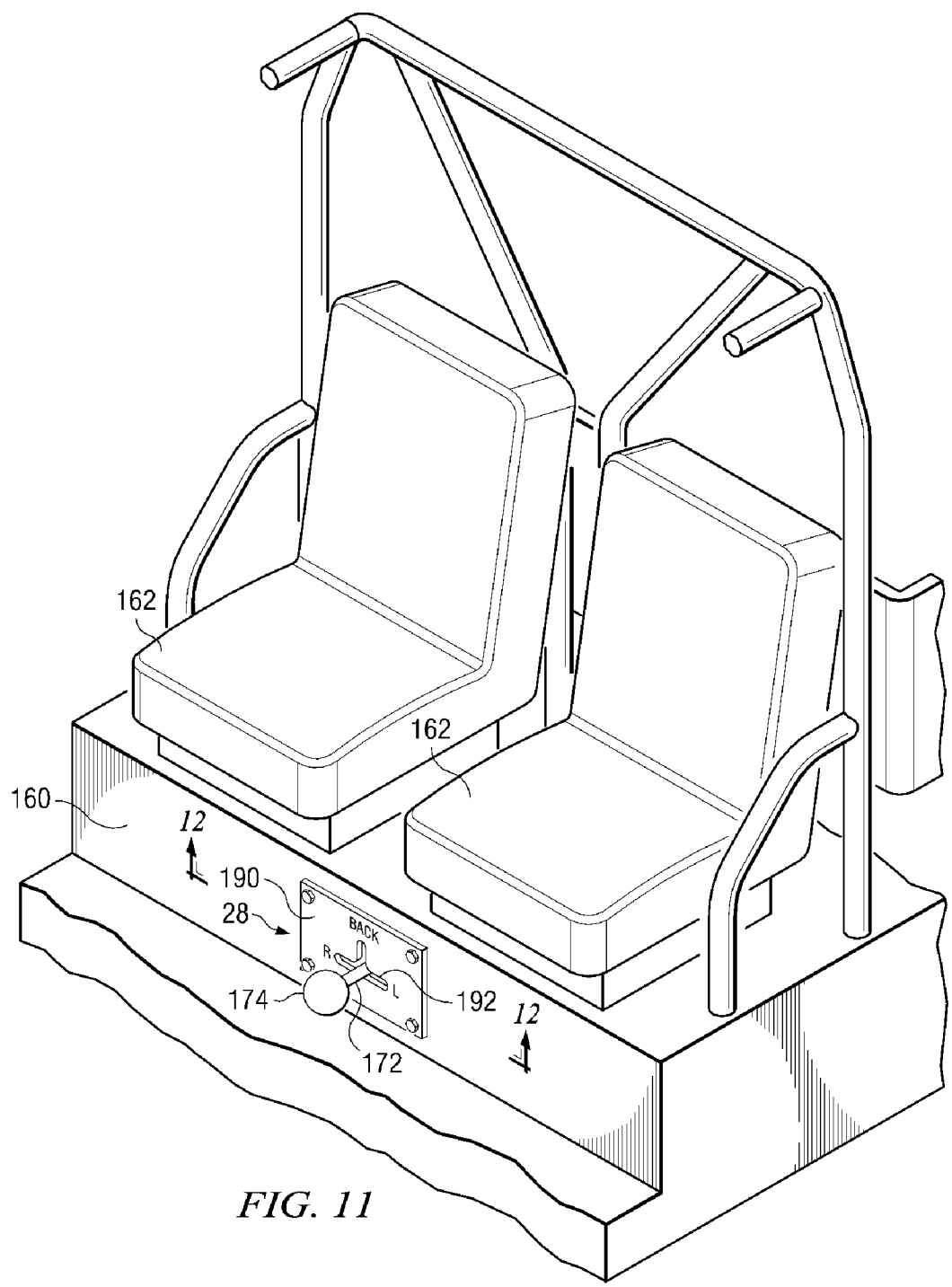
FIG. 11 is a perspective view depicting another portion of the utility vehicle of FIG. 1.
Figure 12:
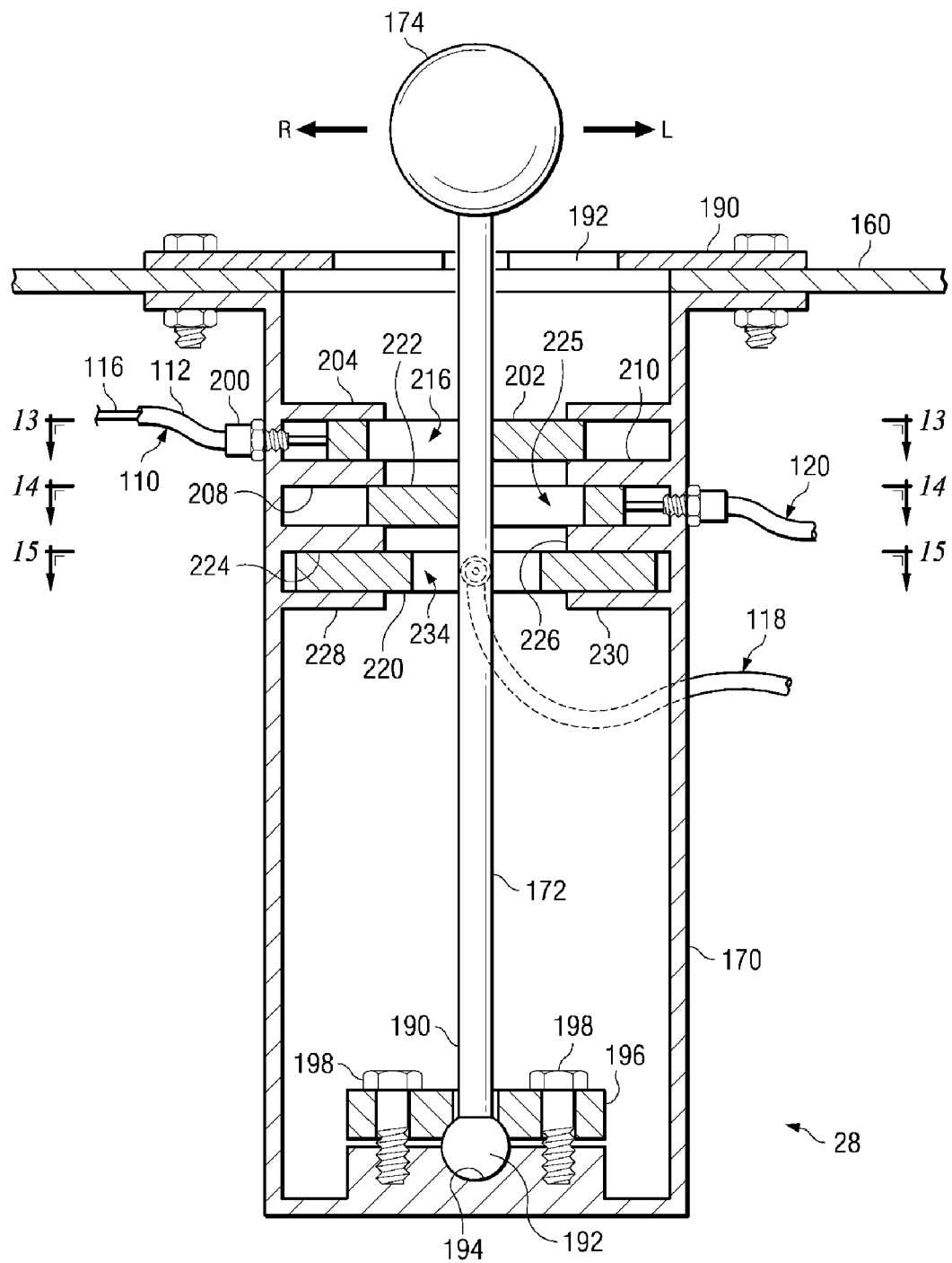
FIG. 12 is a cross-sectional view taken along section lines 12-12 in FIG. 11.

The Bowden-type cables 110, 118, and 120 can be connected to, and actuated by, a handle assembly 28 shown in FIGS. 1 and 11-15. The handle assembly 28 is shown in FIGS. 1 and 11 to be mounted to a wall 160 beneath seats 162 of the utility vehicle 20. However, as the handle assembly 28 can be self-contained and the Bowden-type cables 110, 118, and 120 can be flexible, it will be appreciated that the handle assembly 28 can alternatively be provided in any of a variety of other suitable locations upon the utility vehicle 20. Referring now to FIGS. 11-12, the handle assembly 28 can include a housing 170 and a lever or handle 172 to which a knob 174 is attached. The handle 172 can extend through a face plate 190 and into the housing 170. The face plate 190 is shown in FIG. 11 to include a T-shaped slot 192 which constrains the movement of the handle 172 to a rest position (shown in FIG. 11), a left position, a right position, and a back position. In one embodiment, to facilitate this movement of the handle 172, an inside end 190 of the handle 172 can be fitted with a ball 192 which is moveably received within a socket 194. The socket 194 can be split horizontally such that a first portion of the socket 194 is defined by the housing 170 and another portion of the socket 194 is defined by a plate 196 which can be secured to the housing 170 with bolts 198. Adjustment of the bolts 198 can result in adjustment of the friction between the ball 192 and the socket 194. It will be appreciated that an inside end of a handle can be moveably attached or coupled with a housing in any of a variety of other suitable configurations.

To facilitate connection of the Bowden-type cables, 110, 118 and 120 to the handle assembly 28, the outer sheath of each Bowden-type cable can be received within a suitable socket which is mounted to the housing 170, and the inner cable of each Bowden-type cable can be operably connected with a moveable portion of the handle assembly 28 which is selectively actuated through movement of the handle 172. For example, with respect to the Bowden-type cable 110, the outer sheath 112 is shown in FIG. 12 to be received within a socket 200 which is attached to the housing 170, and the inner cable 116 is shown to be operably connected with an actuator plate 202. Bowden-type cables 118 and 120 are shown to be similarly attached to the housing 170 and operably connected with respective actuator plates 220 and 222.

Figure 13:
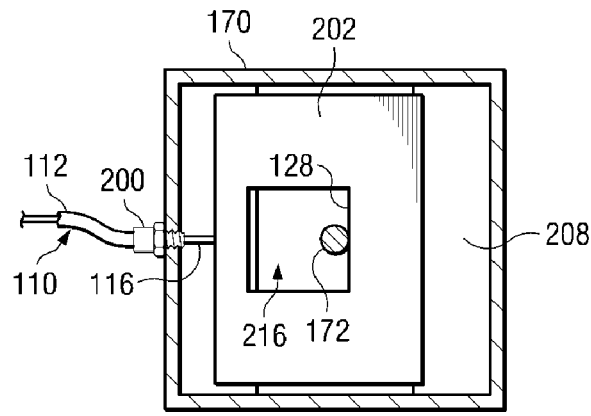
FIG. 13 is a cross-sectional view taken along section lines 13-13 in FIG. 12.

The actuator plate 202 is shown in FIG. 12 to be captured by guide fingers 204 and 208 of the housing 170 which constrain movement of the actuator plate 202 to be generally perpendicular to the axis of the handle 172. The actuator plate 202 is shown in FIGS. 12 and 13 to have an opening 216 through which the handle 172 extends. The opening 216 can be shaped so that if the handle 172 is maintained in the central position (as in FIG. 11) or is moved to the "R" or "BACK" positions as shown in FIG. 11, no movement is imparted to the inner cable 116, and the retractable pin 86 is not retracted. In this configuration, when the handle 172 is moved to the "L" position, the handle 172 contacts an inner side wall 128 of the actuator plate 202 which causes movement of the actuator plate 202 and pulling of the inner cable 116, which in turn retracts the first retractable pin 86, and allows the dump bed 22 to dump to the left.

Figure 14:
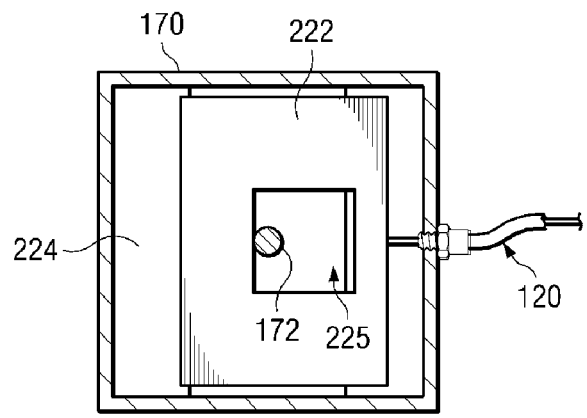
FIG. 14 is a cross-sectional view taken along section lines 14-14 in FIG. 12.

Similarly, with reference to FIGS. 11, 12, and 14, the actuator plate 222 can be captured by guide fingers 208 and 224 of the housing 170 which constrain movement of the actuator plate 222 to be generally perpendicular to the axis of the handle 172. The actuator plate 222 is shown in FIGS. 12 and 14 to have an opening 225 through which the handle 172 extends. The opening 225 can be shaped so that if the handle 172 is maintained in the central position (as in FIG. 11) or is moved to the "L" or "BACK" positions as shown in FIG. 11, no movement is imparted to the inner cable of the Bowden-type cable 120, and the retractable pin 90 is not retracted. In this configuration, when the handle 172 is moved to the "R" position, the handle 172 contacts an inner side wall of the actuator plate 222 which causes movement of the actuator plate 222 and pulling of the inner cable of the Bowden-type cable 120, which in turn retracts the retractable pin 90, and allows the dump bed 22 to dump to the right.

Figure 15:
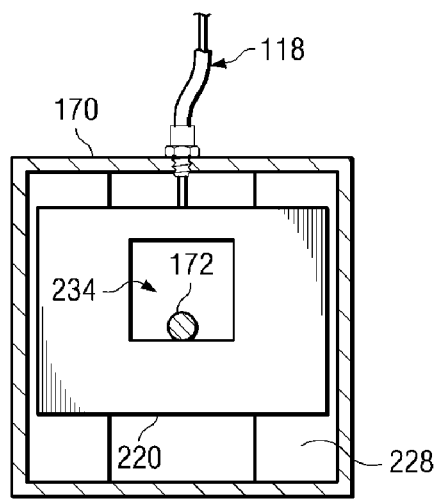
FIG. 15 is a cross-sectional view taken along section lines 15-15 in FIG. 12.

Similarly, with reference to FIGS. 11, 12, and 15, the actuator plate 220 can be captured by guide fingers 224 and 228 of the housing 170 which constrain movement of the actuator plate 220 to be generally perpendicular to the axis of the handle 172. The actuator plate 220 is shown in FIGS. 12 and 15 to have an opening 234 through which the handle 172 extends. The opening 234 can be shaped so that if the handle 172 is maintained in the central position (as in FIG. 11) or is moved to the "L" or "R" positions as shown in FIG. 11, no movement is imparted to the inner cable of the Bowden-type cable 118, and the retractable pin 88 is not retracted. In this configuration, when the handle 172 is moved to the "BACK" position, the handle 172 contacts an inner side wall of the actuator plate 220 which causes movement of the actuator plate 220 and pulling of the inner cable of the Bowden-type cable 118, which in turn retracts the retractable pin 88, and allows the dump bed 22 to dump to the rear.

The handle 172 can accordingly be coupled with three linkage members (i.e., Bowden-type cables 110, 118 and 120) which are additionally coupled with respective retaining elements (i.e., retractable pins 86, 88 and 90) of the ball joint assembly 24. Movement of the handle 172 can selectively apply tension to at least one of the Bowden-type cables 110, 118, and 120 and can accordingly result in movement of at least one of the retractable pins 86, 88, and 90. In one particular embodiment, movement of the handle 172 can selectively apply tension to only one of the Bowden-type cables 110, 118, and 120 at any given time, which in turn results in movement of only a corresponding one of the retractable pins 86, 88, and 90. The handle 172 can facilitate selective engagement of the groove 60 by the retractable pin 86, the groove 62 by the retractable pin 88, and the groove 64 by the retractable pin 90. In the particular embodiment of FIGS. 1-15, the handle 172 is coupled with each of the respective Bowden-type cables 110, 118, and 120 such that movement of the handle 172 results in application of tension by the handle 172 to only one of the respective Bowden-type cables 110, 118, and 120 at any given time. The handle 172 can be moveable among a central position (shown in FIG. 11) to facilitate positioning of the dump bed 22 in the load carrying position (shown in FIG. 1), a left position (marked "L" in FIG. 11) to facilitate tilting of the dump bed 22 to the left tilting position (shown in FIG. 4), a right position (marked "R" in FIG. 11) to facilitate tilting of the dump bed 22 to the right tilting position (shown in FIG. 5), and a rearward position (marked "REAR" in FIG. 11 and in which the handle is moved vertically upwardly from the central position) to facilitate tilting of the dump bed 22 to the rear tilting position (shown in FIG. 6).

In one embodiment, when an operator's hand is removed from the knob 174, the handle 172 can automatically return to the central position (shown in FIG. 11), such as under force of springs (e.g., 104) associated with the retractable pins 86, 88, and 90. In another embodiment, when an operator's hand is removed from the knob 174, the handle 172 can remain in its present position until manually moved to another position by the operator. For example, the friction provided by the socket 194 upon the ball 192 can be sufficient such that the position of the handle 172 does not change when an operator's hand is removed from the handle 172 because the springs (e.g., 104 in FIG. 8) associated with the retractable pins (e.g., 86 in FIG. 8) do not, in that embodiment, impose sufficient force to overcome the friction imposed upon the ball 192 by the socket 194. In another embodiment, a handle can be selectively retained at one or more positions by any of a variety of suitable mechanical locking features. For example, in one embodiment, a slot in a face plate of an actuator may be shaped with a short hook shape (not shown) at the end of each leg of the "T" or other shape formed by the slot, such that the handle catches within the hook when moved to that position until manually moved by an operator. In another alternative embodiment, inner cables of Bowden-type cables can be sufficiently stiff to be pushed as well as pulled, in which case springs (e.g., 104) might not be associated with the retractable pins (e.g., 86). It will be appreciated that, in other embodiments, a handle assembly can have any of a variety of other suitable configurations.

Once one of the retractable pins 86, 88, and 90 has been retracted, the dump bed 22 can be free to tip in one of the three available tipping directions. If cargo is unevenly distributed within the dump bed 22, tipping may occur as soon as the first, second, or third pin 86, 88, or 90, respectively, is retracted. Otherwise the dump bed 22 may require an applied force to accomplish tipping. This applied force can occur through any of a variety of suitable methods or mechanisms. In one embodiment, an operator of the utility vehicle 20 can manually lift an edge of the dump bed 22 to cause tipping in a particular direction. In another embodiment, the dump bed 22 can be provided with one or more stirrups (240, 242, 244, 246, and 248 in FIGS. 1 and 3-6) and, once one of the retractable pins 86, 88, and 90 has been retracted, an operator can step upon one of the stirrups to cause tipping of the dump bed 22 in a particular direction. The stirrups can be formed from rigid metal components, braided metal wire, non-metal components, and/or from any of a variety of other suitable materials. It will be appreciated that stirrups can be provided in any of a variety of other suitable arrangements and quantity as an alternative to that depicted in FIGS. 1 and 3-6. It will also be appreciated that such stirrups can serve as a step to facilitate climbing into the dump bed 22 by an operator. In an alternative embodiment (not shown), such a step or stirrup can be integrated into a side or rear folding tailgate or other sidewall gate structure of a dump bed.

As still another alternative to facilitate application of force for tipping of the dump bed 22, a power actuator can be coupled with the dump bed 22. In one embodiment, the power actuator can comprise one or more hydraulic and/or pneumatic cylinders. In another embodiment, the power actuator can comprise a foot pedal (e.g., located near accelerator and brake pedals on the utility vehicle 20) which can be depressed or pumped by an operator to result in tipping of the dump bed 22. In still another embodiment, the utility vehicle 20 can be provided with a winch 256 as shown in FIG. 1, and a cable 258 from the winch 256 can be selectively strung over a roll bar 260 of the utility vehicle 20 and hooked to the dump bed 22 in an appropriate location such that retraction of the cable 258 by the winch 256 results in tipping of the dump bed 22 to any of the available tipping positions depending upon the manner and location in which the cable 258 is attached to the dump bed 22 and which of the retractable pins 86, 88, and 90 is retracted.

Though the ball joint assembly 24 is shown and described to include three grooves 60, 62, and 64 and three retractable pins 86, 88, and 90, it will be appreciated that a ball joint assembly in accordance with another embodiment can have a different quantity and arrangement of grooves and retaining elements. For example, in one alternative embodiment, a ball joint assembly might include a ball having only two grooves which facilitate tipping of a dump bed in two diagonal directions (i.e., toward rear-left and rear-right corners of the utility vehicle). In another alternative embodiment, a ball joint assembly might include a ball having only two grooves which facilitate tipping of a dump bed to the left or right, but not to the rear. In still another alternative embodiment, a ball joint assembly might include a ball having only two grooves which facilitate tipping of a dump bed to the left or to the rear, but not to the right. In yet another alternative embodiment, a ball joint assembly might include a ball having only two grooves which facilitate tipping of a dump bed to the right or to the rear, but not to the left.

While each of the retractable pins 86, 88, and 90 is shown and described to connect with respective Bowden-type cables, it will be appreciated that one or more of the retractable pins can alternatively be associated with a power actuator (e.g., a hydraulic piston, a pneumatic piston, or an electromagnetic solenoid plunger), and each such power actuator can be coupled with and controlled by a suitable actuator. For example, in such an embodiment in which respective electromagnetic solenoid plungers are directly coupled with each respective retractable pin of a ball joint assembly, it will be appreciated that electrical signals for controlling the electromagnetic solenoid plungers can originate at an actuator accessible to an operator of the utility vehicle. That actuator can comprise, for example, one or more electrical switches in the form of a rotary knob or handle, toggle switches, rocker switches, pushbuttons or otherwise. It will also be appreciated that a retaining element might not comprise a retractable pin, but might rather comprise a rotatable cam or other moveable mechanical feature which can selectively engage a groove in a ball.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
   a frame structure;
   a dump bed;
   a ball joint assembly coupling the dump bed to the frame structure, the ball joint assembly comprising a ball and a receiver, the ball defining first and second grooves and comprising an external surface, the receiver comprising an internal surface, a portion of the internal surface of the receiver engaging a portion of the external surface of the ball, one of the ball and the receiver being attached to the frame structure, and the other of the ball and the receiver being attached to the dump bed;
   a first retaining element moveably coupled with the receiver and configured to selectively engage the first groove in the ball;
   a second retaining element moveably coupled with the receiver and configured to selectively engage the second groove in the ball; and
   an actuator coupled with each of the first and second retaining elements and configured to facilitate selective engagement of the first groove by the first retaining element and the second groove by the second retaining element.

2. The vehicle of claim 1 further comprising a third retaining element moveably coupled with the receiver, wherein the ball further defines a third groove, the third retaining element is configured to selectively engage the third groove, and the actuator is further coupled with the third retaining element and is further configured to facilitate selective engagement of the third groove by the third retaining element.

3. The vehicle of claim 2 wherein the ball is vertically bisected by first and second planes, the first and second planes orthogonally intersect one another, the first plane bisects each of the first and third grooves, and the second plane bisects the second groove.

4. The vehicle of claim 3 wherein the first groove comprises a first meridional slot, the second groove comprises a second meridional slot, and the third groove comprises a third meridional slot.

5. The vehicle of claim 3 wherein the first and third retaining elements comprise respective first and third pins that are each selectively moveable axially along a first axis.

6. The vehicle of claim 5 wherein the second retaining element comprises a second pin that is selectively moveable axially along a second axis that lies orthogonal to the first axis.

7. The vehicle of claim 5 wherein the receiver is pivotable about the first axis when the second retaining element is disengaged from the second groove.

8. The vehicle of claim 6 wherein the receiver is pivotable about the second axis when at least at least one of the first retaining element does not engage the first groove and the third retaining element does not engage the third groove.

9. The vehicle of claim 4 wherein the each of the first, second, and third meridional slots approach an intersection and comprises a respective end wall opposite the intersection, and each of the first, second, and third retaining elements are adjacent to a respective one of the respective end walls when the receiver is in a central position with respect to the ball.

10. The vehicle of claim 9 wherein the receiver further comprises a fixed pin, the fixed pin being received in the intersection when the receiver is in the central position.

11. The vehicle of claim 2 wherein each of the first, second, and third retaining elements is spring-biased to engage the respective first, second, and third grooves.

12. The vehicle of claim 2 wherein the actuator comprises a handle movable among a first position, a second position, and a third position, wherein the handle is coupled with each of the first retaining element, the second retaining element, and the third retaining element, and wherein the handle is configured to facilitate selective engagement of the first groove by the first retaining element, the second groove by the second retaining element, and the third groove by the third retaining element.

13. The vehicle of claim 12 further comprising a first linkage member, a second linkage member, and a third linkage member, wherein the first linkage member is coupled with the handle and the first retaining element, the second linkage member is coupled with the handle and the second retaining element, and the third linkage member is coupled with the handle and the third retaining element.

14. The vehicle of claim 13 wherein each of the first linkage member, the second linkage member, and the third linkage member comprises a respective Bowden-type cable, such that movement of the handle selectively applies tension to at least one of the Bowden-type cables and results in movement of at least one of the first retaining element, the second retaining element, and the third retaining element.

15. An apparatus for connecting a dump bed to a frame structure of a vehicle and facilitating tipping of the dump bed in a selected one of a plurality of directions from a load carrying position, the apparatus comprising:

a ball joint assembly comprising a ball and a receiver, the ball defining first and second grooves and comprising an external surface, the receiver comprising an internal surface, a portion of the internal surface of the receiver engaging a portion of the external surface of the ball, one of the ball and the receiver being adapted to attach to a frame structure of a vehicle, and the other of the ball and the receiver being adapted to attach to a dump bed;

a first retaining element moveably coupled with the receiver and configured to selectively engage the first groove in the ball;

a second retaining element moveably coupled with the receiver and configured to selectively engage the second groove in the ball; and an actuator coupled with each of the first and second retaining elements and configured to facilitate selective engagement of the first groove by the first retaining element and the second groove by the second retaining element.

16. The apparatus of claim 15 further comprising a third retaining element moveably coupled with the receiver, wherein the ball further defines a third groove, the third retaining element is configured to selectively engage the third groove, and the actuator is further coupled with the third retaining element and is further configured to facilitate selective engagement of the third groove by the third retaining element.

17. The apparatus of claim 16 wherein the ball is vertically bisected by first and second planes, the first and second planes orthogonally intersect one another, the first plane bisects each of the first and third grooves, and the second plane bisects the second groove.

18. The apparatus of claim 16 wherein the actuator comprises a handle movable among a first position, a second position, and a third position, wherein the handle is coupled with each of the first retaining element, the second retaining element, and the third retaining element, and wherein the handle is configured to facilitate selective engagement of the first groove by the first retaining element, the second groove by the second retaining element, and the third groove by the third retaining element.

19. The apparatus of claim 18 further comprising a first linkage member, a second linkage member, and a third linkage member, wherein the first linkage member is coupled with the handle and the first retaining element, the second linkage member is coupled with the handle and the second retaining element, and the third linkage member is coupled with the handle and the third retaining element.

* * * * *

UNITED STATES PATENT AND TRADEMARK OFFICE
CERTIFICATE OF CORRECTION

| | | |
|---|---|---|
| PATENT NO. | : 7,770,981 B2 | |
| APPLICATION NO. | : 12/212078 | |
| DATED | : August 10, 2010 | |
| INVENTOR(S) | : Darin D. King et al. | |

It is certified that error appears in the above-identified patent and that said Letters Patent is hereby corrected as shown below:

Detailed Description, Column 3, line 6, change "bed as directed" to -- bed 22 as directed --;

Detailed Description, Column 5, line 38, change "sheath 112, which" to -- sheath 112 which --;

Detailed Description, Column 6, line 29, change "62 controls, the" to -- 62 controls the --;

Detailed Description, Column 7, line 4, change "Bowden-type cables, 110," to -- Bowden-type cables 110, --;

Detailed Description, Column 10, line 6, change "can" to -- cam --;

Detailed Description, Column 10, line 13, change "arc" to -- are --;

Claim 8, Column 11, line 9, change "at least at least one" to -- at least one --;

Claim 9, Column 11, line 12, change "wherein the each" to -- wherein each --.

Signed and Sealed this
Third Day of May, 2011

David J. Kappos
*Director of the United States Patent and Trademark Office*